(12) United States Patent
Konishi et al.

(10) Patent No.: US 9,796,631 B2
(45) Date of Patent: *Oct. 24, 2017

(54) METHOD OF MANUFACTURING BARIUM TITANATE AND ELECTRONIC COMPONENT OF BARIUM TITANATE

(71) Applicant: Murata Manufacturing Co., Ltd., Nagaokakyo-shi, Kyoto-fu (JP)

(72) Inventors: Shinya Konishi, Nagaokakyo (JP); Kazuya Fujii, Nagaokakyo (JP); Kazushige Nada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,329

(22) Filed: Nov. 11, 2015

(65) Prior Publication Data

US 2016/0060175 A1 Mar. 3, 2016

Related U.S. Application Data

(63) Continuation of application No. PCT/JP2014/062734, filed on May 13, 2014.

(30) Foreign Application Priority Data

Jun. 12, 2013 (JP) .................. 2013-124032

(51) Int. Cl.
*C04B 35/46* (2006.01)
*C01G 23/00* (2006.01)
(Continued)

(52) U.S. Cl.
CPC ........ *C04B 35/4682* (2013.01); *C01G 23/006* (2013.01); *H01G 4/1227* (2013.01);
(Continued)

(58) Field of Classification Search
CPC ...... C01G 23/006; H01G 4/30; H01G 4/1227; C04B 2235/5445; C04B 2235/5454; C01P 2006/12; C01P 2004/62; C01P 2004/64
See application file for complete search history.

(56) References Cited

U.S. PATENT DOCUMENTS

| 4,845,056 A | 7/1989 | Yamanis |
|---|---|---|
| 7,556,792 B2 | 7/2009 | Torii et al. |

(Continued)

FOREIGN PATENT DOCUMENTS

| CN | 105164052 A | 12/2015 |
|---|---|---|
| JP | S62-212225 A | 9/1987 |

(Continued)

OTHER PUBLICATIONS

Bocquet et al., "Barium titanate powders synthesis from solvothermal reaction and supercritical treatment," Materials Chemistry and Physics 57 (1999) 273-580.*

(Continued)

*Primary Examiner* — Anthony J Zimmer
(74) *Attorney, Agent, or Firm* — Arent Fox LLP

(57) ABSTRACT

A method of manufacturing barium titanate powder by dispersing, in a solvent such as ethanol, barium titanate. Then, the barium titanate is separated from the slurry by evaporating the solvent while pressurizing the slurry in a pressure container. Then, the separated barium titanate is subjected to a heat treatment, thereby producing the barium titanate powder.

17 Claims, 3 Drawing Sheets

(51) Int. Cl.
  *H01G 4/30* (2006.01)
  *H01G 4/12* (2006.01)
  *C04B 35/468* (2006.01)

(52) U.S. Cl.
  CPC ........... *H01G 4/30* (2013.01); *C01P 2004/62* (2013.01); *C01P 2004/64* (2013.01); *C01P 2006/12* (2013.01); *C04B 2235/5445* (2013.01); *C04B 2235/5454* (2013.01)

(56) References Cited

U.S. PATENT DOCUMENTS

| | | |
|---|---|---|
| 2007/0286796 A1 | 12/2007 | Koper et al. |
| 2010/0080751 A1* | 4/2010 | Huang .................. B82Y 30/00 423/598 |
| 2016/0052794 A1 | 2/2016 | Konishi et al. |

FOREIGN PATENT DOCUMENTS

| | | |
|---|---|---|
| JP | H03-500527 A | 2/1991 |
| JP | 2003-252623 A | 9/2003 |
| JP | 2009-026820 A | 2/2009 |
| JP | 2009-269791 A | 11/2009 |
| JP | 2009-540510 A | 11/2009 |
| JP | 2012-062229 A | 3/2012 |
| JP | 2012-140309 A | 7/2012 |

OTHER PUBLICATIONS

International Search Report issued for PCT/JP2014/062734, dated Aug. 19, 2014.
Written Opinion of the International Searching Authority for PCT/JP2014/062734, dated Aug. 19, 2014.
Atsushi Nakahira et al.: "Effect of Supercritical Drying Method on Microstructure and Properties of Al2O3 Composites Reinforced with Ultrafine SiC Particulate"; Journal of the Ceramic Society of Japan, 1999, vol. 107, No. 1245, pp. 460-464.
International Search Report issued for PCT/JP2014/059394, dated Jul. 1, 2014.
Written Opinion of the International Searching Authority issued for PCT/JP2014/059394, dated Jul. 1, 2014.
Zoran Novak et al.: "Preparation of BaTiO3 powders using supercritical CO2 drying of gels"; Journal of Non-Crystalline Solids, vol. 285, 2001, pp. 44-49.
Botao Ji et al.: "Preparation and electrical properties of nanoporous BaTiO3"; Materials Letters 64 (2010), pp. 1836-1838.
Zoran Novak et al.; "Synthesis of barium titanate using supercriticl CO2 drying of gels"; Journal of Supercritical Fluids 19 (2001), pp. 209-215.

* cited by examiner

METHOD OF MANUFACTURING BARIUM TITANATE AND ELECTRONIC COMPONENT OF BARIUM TITANATE

CROSS REFERENCE TO RELATED APPLICATIONS

The present application is a continuation of International application No. PCT/JP2014/062734, filed May 13, 2014, which claims priority to Japanese Patent Application No. 2013-124032, filed Jun. 12, 2013, the entire contents of each of which are incorporated herein by reference.

FIELD OF THE INVENTION

The present invention relates to a method of manufacturing barium titanate and an electronic component of barium titanate, and particularly to a method of manufacturing barium titanate and an electronic component of barium titanate that is, for example, used for a dielectric of a multilayer ceramic capacitor.

BACKGROUND OF THE INVENTION

Japanese Patent Laying-Open No. 2012-62229 (PTD 1) discloses, in claim 1, "a method of manufacturing a perovskite type multiple oxide expressed by the general formula $ABO_3$, said method comprising: a slurry preparation step of preparing titanium oxide slurry obtained by dispersing, in water, titanium oxide powder in which an integral width of a diffraction peak of its (101) plane measured by X-ray diffraction is 2.0° or less; and a reaction step of producing a perovskite type multiple oxide by a reaction caused by adding a hydroxide of an alkaline earth element to said titanium oxide slurry." In claim 6, it also discloses "the method of manufacturing a perovskite type multiple oxide according to any one of claims 1 to 5, further comprising the step of heat-treating the perovskite type multiple oxide produced in said reaction step".

PTD 1 discloses in paragraph 0029 that such a configuration is provided, so that "a perovskite type multiple oxide having a large specific surface area, a high c/a axial ratio and high crystallinity can be obtained".

PTD 1: Japanese Patent Laying-Open No. 2012-62229

SUMMARY OF THE INVENTION

The element thickness of the multilayer ceramic capacitor tends to be increasingly reduced. For example, in order to implement a thinned layer having a thickness of 0.8 μm or less, raw material powder before sintering, for example, powder of a barium titanate-based material, should have a fine particle size of 150 nm or less, for example.

Examples of an adjustment method for obtaining powder of barium titanate-based material include a solid phase method of making an adjustment using barium carbonate powder and titanium oxide powder and a liquid phase method, such as a hydrothermal synthesis method and an oxalic acid method. When fine barium titanate powder of 150 nm or less is synthesized by any of the above-mentioned adjustment methods, the tetragonality tends to decrease due to defects on the surface of each powder particle, that is, the ratio of the c-axis to the a-axis (c/a axial ratio) of the barium titanate crystal tends to decrease. It is known that the barium titanate powder with low tetragonality causes problems that the dielectric constant decreases and particles significantly grow during firing in the case where such barium titanate powder is used for a dielectric layer of a multilayer ceramic capacitor.

Although PTD 1 discloses that "a perovskite type multiple oxide having a large specific surface area, a high c/a axial ratio and high crystallinity can be obtained", fine barium titanate powder with higher crystallinity is required for reducing the element thickness.

Therefore, a main object of the present invention is to provide a method of manufacturing barium titanate, by which barium titanate powder with high tetragonality can be manufactured so as to address reduction in thickness of an element of a multilayer ceramic capacitor for example, irrespective of a fine particle size of 80 nm to 150 nm.

Another object of the present invention is to provide an electronic component including an element produced from barium titanate powder with high tetragonality so as to address reduction in thickness of an element of a multilayer ceramic capacitor for example, irrespective of a fine particle size of 80 nm to 150 nm.

A method of manufacturing barium titanate powder according to the present invention includes: producing a slurry by dispersing, in a solvent, barium titanate; separating the barium titanate by evaporating the solvent while pressurizing the slurry; and heat-treating the separated barium titanate to produce the barium titanate powder.

In the method of manufacturing barium titanate powder according to the present invention, the solvent is, for example, at least one of a water-based solvent, an organic-based solvent, and a water-based and organic-based solvent.

Furthermore, in the method of manufacturing barium titanate powder according to the present invention, the step of separating the barium titanate from the solvent includes, for example: pressurizing the slurry by putting the slurry into a container, heating the slurry from outside of the container, and evaporating the solvent in the slurry; and/or filling the container with gas from the outside of the container.

Furthermore, in the method of manufacturing barium titanate powder according to the present invention, it is preferable that the barium titanate in the slurry is obtained by a reaction caused by adding a hydroxide of an alkaline earth metal element to a titanium oxide slurry that is obtained by dispersing titanium oxide powder in water.

An electronic component according to the present invention is an electronic component including an element produced from the barium titanate powder manufactured by the method according to the present invention.

It has been clarified that a correlation exists in the drying process of barium titanate powder dispersed in the solvent between the surface tension of the solvent and each of the agglomerativity of barium titanate powder and its crystallinity after a heat treatment.

In other words, drying of barium titanate powder progresses from the liquid phase through the gaseous phase in the solvent evaporating process. In this process, the liquid crosslinking force acts to attract particles of the barium titanate powder to each other. This is a main factor of causing dry agglomeration of barium titanate powder. This liquid crosslinking force has a proportional relationship with the surface tension of the solvent. Accordingly, the smaller the surface tension is, the smaller the liquid crosslinking force is, too.

In the method of manufacturing barium titanate according to the present invention, based on the clarified result that a correlation exists between the surface tension of the solvent and each of the agglomerativity of barium titanate powder and its crystallinity after a heat treatment, drying under increased pressure is applied as a method of manufacturing barium titanate powder of high quality (low agglomerativity and high crystallinity). In this drying under increased pressure, a solvent and barium titanate powder are separated by evaporating the solvent while pressurizing the slurry obtained by dispersing fine barium titanate powder in the solvent.

Furthermore, according to the present invention, dried barium titanate powder is subjected to a heat treatment (calcination treatment) to grow particles, thereby manufacturing barium titanate powder with high tetragonality.

According to the present invention, a pressurization process allowing drying with the decreased solvent surface tension is applied to a process of drying barium titanate powder, so that barium titanate powder with low agglomerativity and high crystallinity can be manufactured.

In other words, according to the present invention, the surface tension of the solvent in the slurry is controlled by pressurizing the slurry to thereby implement drying in the optimum surface tension state, so that the liquid crosslinking force exerted between particles is lowered. Therefore, barium titanate dry powder with low agglomerativity can be obtained. Furthermore, according to the present invention, such barium titanate dry powder with low agglomerativity is subjected to a heat treatment (a calcination treatment), so that it becomes possible to obtain barium titanate powder with high tetragonality and of fine particles each having a particle size (specific surface area equivalent particle size) of 80 nm to 150 nm.

Therefore, in the method of manufacturing barium titanate according to the present invention, barium titanate powder with low agglomerativity and high crystallinity can be manufactured.

Furthermore, the method of manufacturing barium titanate according to the present invention is not limited in solvent species, and therefore, can be applicable to the slurry including a water-based solvent or an organic-based solvent.

In the method of manufacturing barium titanate according to the present invention, finer barium titanate powder with higher tetragonality can be obtained in the case where the eventually manufactured barium titanate powder is obtained by a reaction caused by adding a hydroxide of an alkaline earth metal element to titanium oxide slurry that is obtained by dispersing titanium oxide powder in water.

According to the present invention, barium titanate powder with high tetragonality can be manufactured so as to address reduction in thickness of an element of a multilayer ceramic capacitor for example, irrespective of a fine particle size of 80 nm to 150 nm.

Furthermore, according to the present invention, an electronic component including an element produced from barium titanate powder with high tetragonality is obtained so as to address reduction in thickness of an element of a multilayer ceramic capacitor for example, irrespective of a fine particle size of 80 nm to 150 nm.

The above-described objects, other objects, characteristics and advantages of the present invention will be more apparent from the description of the embodiments for implementing the following invention with reference to the accompanying drawings.

DETAILED DESCRIPTION OF THE PREFERRED EMBODIMENTS

First, barium titanate powder finer than barium titanate powder that would be eventually manufactured was prepared.

Such fine barium titanate powder is not particularly limited, but may be produced by the solid phase method, the hydrothermal synthesis method, the oxalic acid method, and the like that are commonly used. In this case, barium titanate powder synthesized by the method disclosed in PTD 1 was used.

Specifically, $TiO_2$ powder having a specific surface area of 300 $m^2/g$ was prepared and mixed with pure water, to thereby produce a $TiO_2$ slurry. The produced $TiO_2$ slurry was heated to a temperature of 70° C., to which $Ba(OH)_2$ powder was subsequently added so as to achieve a Ba/Ti ratio of 1:1 while stirring the slurry. After $Ba(OH)_2$ powder was added, the resultant slurry was held for 1 hour at a temperature of 80° C. or higher while stirring this slurry, so as to cause a reaction between $TiO_2$ and $Ba(OH)_2$. The obtained slurry was placed in an oven, and evaporated and dried, thereby producing $BaTiO_3$ powder (barium titanate powder).

When the specific surface area of the barium titanate powder obtained in this way was measured by the BET method (with Macsorb (registered trademark) manufactured as a measuring instrument by Mountech Co., Ltd.), the result was 65 $m^2/g$ (a specific surface area equivalent particle size of 15 nm). Furthermore, X-ray diffraction (CuKα was used as a radiation source) was performed and the obtained result was subjected to Rietveld analysis, thereby calculating the ratio between the c-axis length and the a-axis length (the c/a axial ratio) of a crystal lattice. As a result, the c/a axial ratio was 1.0000, in which case a cubic crystal was obtained.

Then, such fine barium titanate powder was dispersed in ethanol as a solvent at a concentration of 5 vol % using a ball mill, thereby producing a slurry.

Hereinafter described will be a manufacturing apparatus 10 shown in FIG. 1 that is used for performing the method of manufacturing barium titanate powder from such a slurry.

Figure 1:
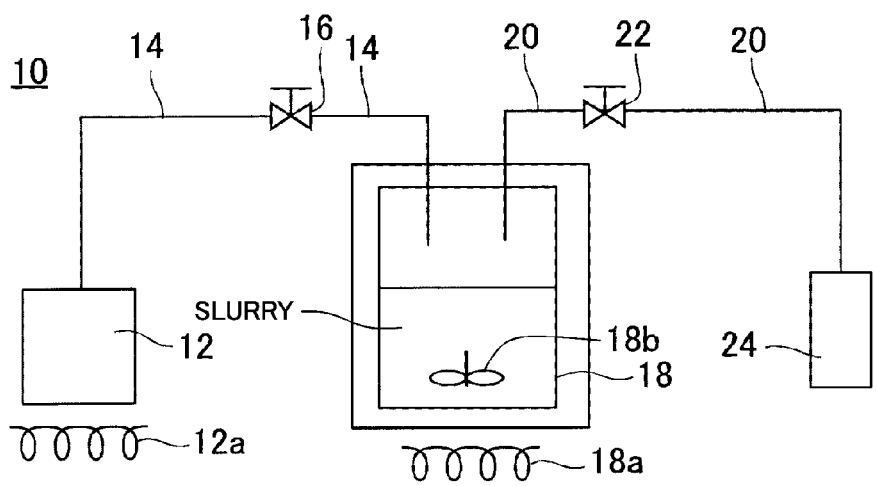
FIG. 1 is a schematic diagram showing an example of a manufacturing apparatus used for implementing a method of manufacturing barium titanate according to the present invention.

Manufacturing apparatus 10 shown in FIG. 1 includes a gas container 12. Gas container 12 is filled with gas, for example, $N_2$ gas, that allows pressurization of a slurry within a pressure container 18 that will be described below. Furthermore, a heater 12a of a heating apparatus (not shown) is provided in the vicinity of gas container 12. This heater 12a serves to heat gas in gas container 12.

Gas container 12 is connected to pressure container 18 through a feed pipe 14 and a pressure valve 16. In other words, gas container 12 and the inlet of pressure valve 16 are connected through feed pipe 14, and the outlet of pressure valve 16 and pressure container 18 are also connected through feed pipe 14.

Feed pipe 14 serves to supply $N_2$ gas within gas container 12 to pressure container 18. Furthermore, pressure valve 16 is opened or closed between gas container 12 and pressure container 18.

Pressure container 18 serves, for example, as a container for drying barium titanate powder in the above-described slurry under increased pressure (drying under increased pressure). Accordingly, a heater 18a of a heating apparatus (not shown) is provided in the vicinity of pressure container 18. This heater 18a serves to heat the slurry within pressure container 18. Furthermore, a stirring blade 18b for stirring the slurry within pressure container 18 is provided within pressure container 18.

Furthermore, pressure container 18 is connected to a collection unit 24 having a cooling device (not shown) through discharge pipe 20 and automatic pressure regulation valve 22. Specifically, pressure container 18 and the inlet of automatic pressure regulation valve 22 are connected through discharge pipe 20, and the outlet of automatic pressure regulation valve 22 and collection unit 24 are also connected through discharge pipe 20.

Discharge pipe 20 serves to discharge collected substances such as ethanol and $N_2$ gas from pressure container 18 to collection unit 24. Furthermore, automatic pressure regulation valve 22 is automatically opened or closed between pressure container 18 and collection unit 24 for adjusting the pressure within pressure container 18. Furthermore, collection unit 24 serves to collect collected substances such as ethanol and $N_2$ gas from pressure container 18.

The above-described slurry was put into pressure container 18 of manufacturing apparatus 10 shown in FIG. 1, gas container 12 and pressure container 18 were heated by heaters 12a and 18a, and then, heated $N_2$ gas was introduced from gas container 12 through feed pipe 14 and pressure valve 16 into pressure container 18, so as to pressurize the inside of pressure container 18.

In this case, the gage pressure of automatic pressure regulation valve 22 showing the pressure within pressure container 18 was regulated to be set at 0.2 MPa, for example. Then, when the pressure exceeded this set value, automatic pressure regulation valve 22 was automatically opened, so as to cause $N_2$ gas and the evaporated ethanol within pressure container 18 to be discharged through discharge pipe 20.

The discharged ethanol was cooled in a cooling device (not shown) of collection unit 24, and collected as ethanol (liquid) in collection unit 24.

Figure 2:
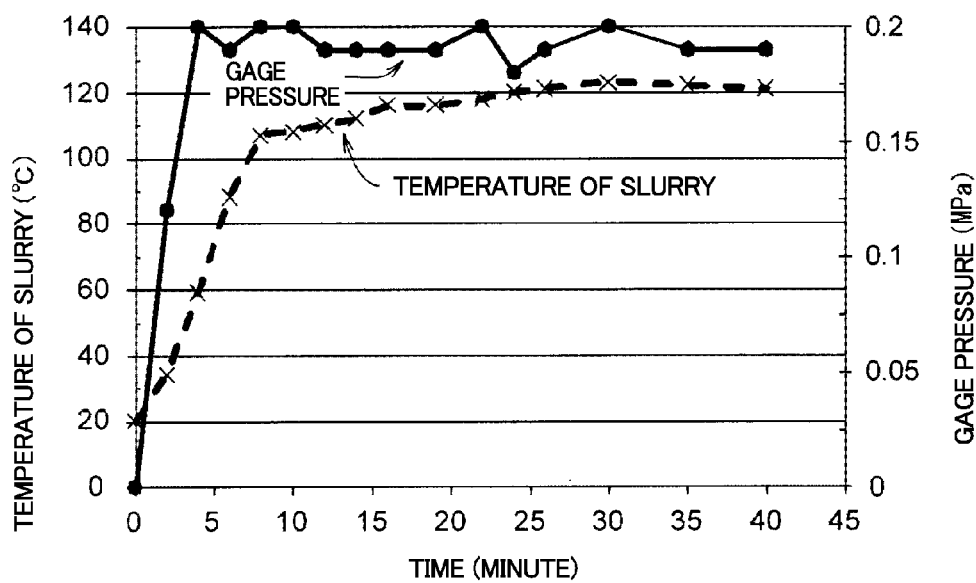
FIG. 2 is a graph showing the relation between the temperature of the slurry and the gage pressure of an automatic pressure regulation valve.

The graph in FIG. 2 shows the relation between the temperature of the slurry and the gage pressure of automatic pressure regulation valve 22 during the above-described process. As apparent from the graph in FIG. 2, the slurry is pressurized to 0.2 MPa and thereby dried, so that the temperature of the slurry can be raised to 110° C. to 130° C. so as to be dried.

Then, at the point of time when collection of ethanol and $N_2$ gas ended, the pressure within pressure container 18 was lowered to atmospheric pressure. Then, heaters 12a and 18a of the heating apparatus were turned off to lower the temperature within pressure container 18. After that, the separated barium titanate dry powder (Example) within pressure container 18 was removed.

Furthermore, in order to compare the effects of drying under increased pressure, the slurry similar to the above-described slurry and separately subjected to a dispersion treatment was discharged onto a bat (a tray), which was placed in an oven set at a temperature of 80° C., and ethanol in the slurry was evaporated, that is, the slurry was dried under atmospheric pressure or normal pressure (drying under normal pressure), thereby producing barium titanate dry powder (Comparative Example 1). It is to be noted that the resultant powder obtained in Comparative Example 1 falls outside the scope of the present invention.

Furthermore, the slurry similar to the above-described slurry and separately subjected to a dispersion treatment was put into a pressure container, which was then heated to a temperature of 60° C. Then, the pressure inside the pressure container was lowered to 5 kPa-20 kPa using a rotary pump, to evaporate ethanol, that is, to dry ethanol under reduced pressure (drying under reduced pressure), thereby producing barium titanate dry powder (Comparative Example 2). It is to be noted that the resultant powder obtained in Comparative Example 2 also falls outside the scope of the present invention.

A prescribed amount of barium titanate dry powder according to each of Example, Comparative Example 1 and Comparative Example 2 that was produced as described above was put into a sagger of $ZrO_2$ substance and then calcined in a firing furnace for 2 hours at a temperature of 800° C. to 1000° C. as a heat treatment.

Figure 3:
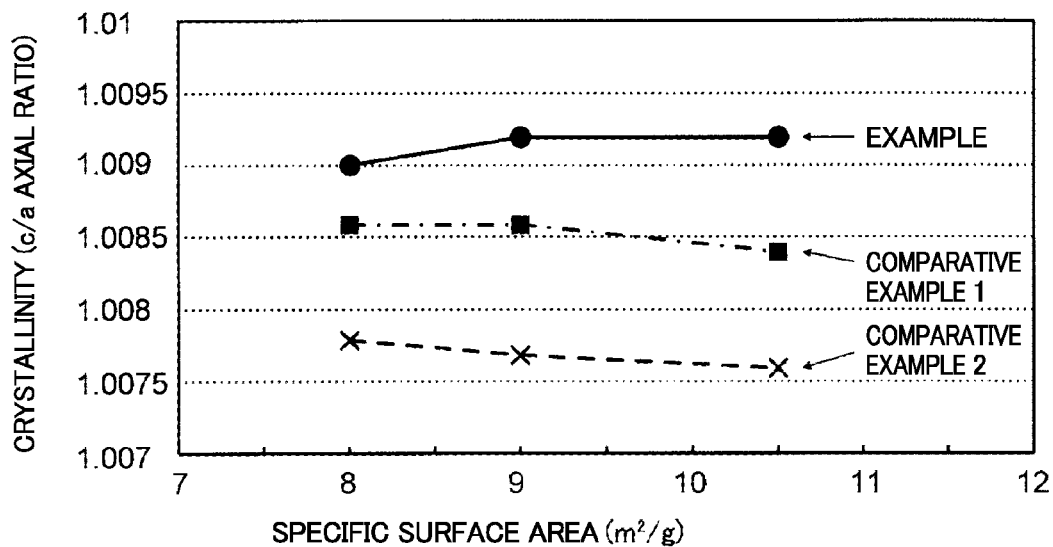
FIG. 3 is a graph showing the relation between the specific surface area and the crystallinity (c/a axial ratio) of barium titanate powder according to each of Example, Comparative Example 1, and Comparative Example 2.

The specific surface area ($m^2/g$) and the crystallinity (c/a axial ratio) of calcined powder (calcined powder of barium titanate) produced in this way were measured in the same manner as described above. The relation between the specific surface area ($m^2/g$) and the crystallinity (c/a axial ratio) is shown in the graph of FIG. 3.

Figure 4:
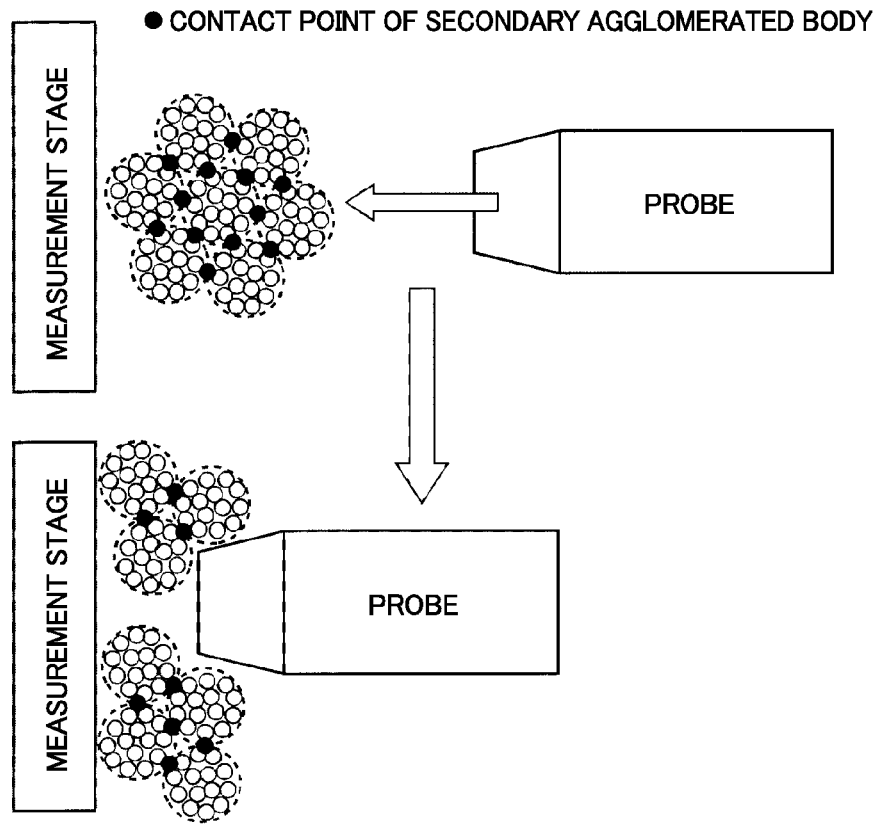
FIG. 4 is a diagram showing an image of measurement of the crushing strength of barium titanate powder.

Furthermore, as to the dry powder and calcined powder of barium titanate produced as described above, a fine particle crushing force measurement apparatus NS-A100 type manufactured by Nano Seeds Corporation was used to measure the crushing strength of each of dry powder and calcined powder, that is, the force at the time when powder particles were crushed as shown in FIG. 4. In this case, as shown on the upper side in FIG. 4, powder particles were pressed against a measurement stage with a probe, and as shown on the lower side in FIG. 4, the force was measured at the time when powder particles were crushed at the contact point of the secondary agglomerated body of powder particles. In addition, a probe was pressed against the produced barium titanate powder, and the force immediately before this powder was crumbled was defined as crushing force. Then, the crushing strength was calculated from this value of the defined crushing force and the particle diameter, and defined as a simple index of the agglomeration force. Table 1 shows the measurement result of the crushing strength of each.

TABLE 1

| | Crushing Strength (kPa) | |
| --- | --- | --- |
| Sample | Dry powder | Calcined Powder |
| Example | 187 | 208 |
| Comparative Example 1 | 330 | 642 |
| Comparative Example 2 | 1210 | 2150 |

The above-described crushing strength is obtained by measuring the strength at the time when powder was crumbled by applying a load to the powder with a micro-sized probe (crushing strength). In other words, the agglomeration force of powder can be evaluated. It was found that the dry powder and its calcined powder obtained by drying under increased pressure (Example) are less in crushing strength than the dry powder and its calcined powder obtained by drying under normal pressure or drying under reduced pressure (Comparative Example 1 and Comparative Example 2). In other words, it is considered that agglomeration of the powder obtained by drying under increased pressure is suppressed as compared with the powder obtained by drying under normal pressure or drying under reduced pressure.

According to the calcined powder obtained by subjecting such dry powder to a heat treatment (calcination treatment), the powder obtained by drying under increased pressure can achieve barium titanate powder with tetragonality that is higher, at the same level of specific surface area, than that of the powder obtained by drying under normal pressure or by drying under reduced pressure. In other words, as shown in FIG. 3, when making a comparison using powder having a specific surface area of about 10 $m^2/g$ (specific surface area equivalent particle size of 100 nm), the c/a axial ratio is 1.009 or more in Example (powder obtained by drying under increased pressure), whereas the c/a axial ratio is about 1.0085 in Comparative Example 1 (powder obtained by drying under normal pressure) and slightly exceeds 1.0075 in Comparative Example 2 (powder obtained by drying under reduced pressure). Thus, the powder in Example can implement barium titanate powder with tetragonality that is higher than that of the powder obtained in each of Comparative Examples 1 and 2.

Figure 5:
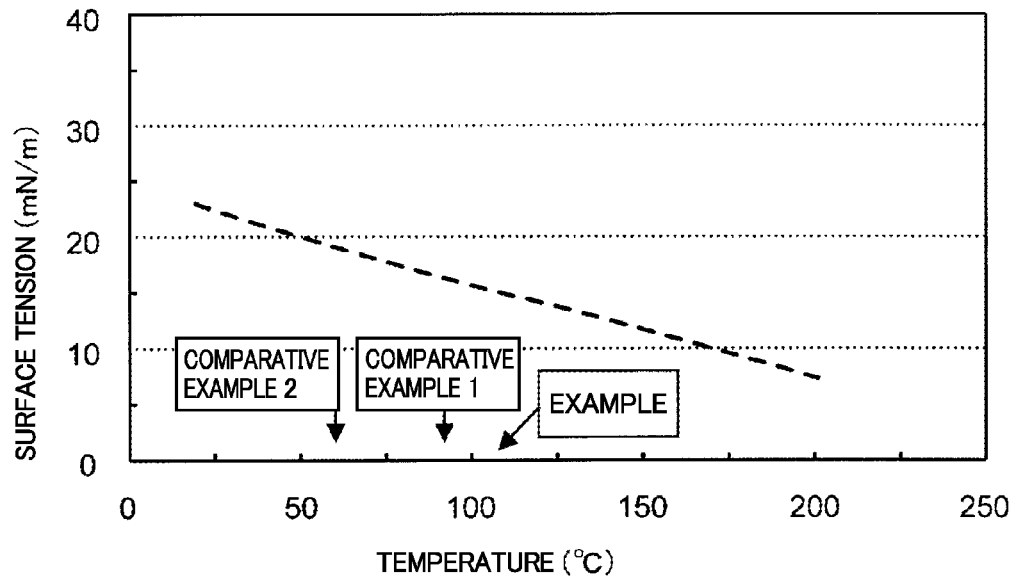
FIG. 5 is a graph showing the relation between the temperature and the surface tension of ethanol as a solvent.

In the case where the slurry obtained by dispersing barium titanate powder in the solvent is dried, it is general to perform drying under reduced pressure as in Comparative Example 2 or drying under normal pressure as in Comparative Example 1, in order to increase the drying efficiency, that is, in order to lower the boiling point. According to these methods, however, as compared with the case where drying under increased pressure is performed as in Example, the surface tension becomes larger as the boiling point temperature lowers as shown in FIG. 5, with the result that strong agglomeration occurs when the slurry is dried. In addition, irrespective of solvent species, the boiling point of the solvent lowers and the surface tension rises under reduced pressure as compared with the case under normal pressure, and also, the boiling point of the solvent rises and the surface tension lowers under increased pressure as compared with the case under normal pressure.

Figure 6:
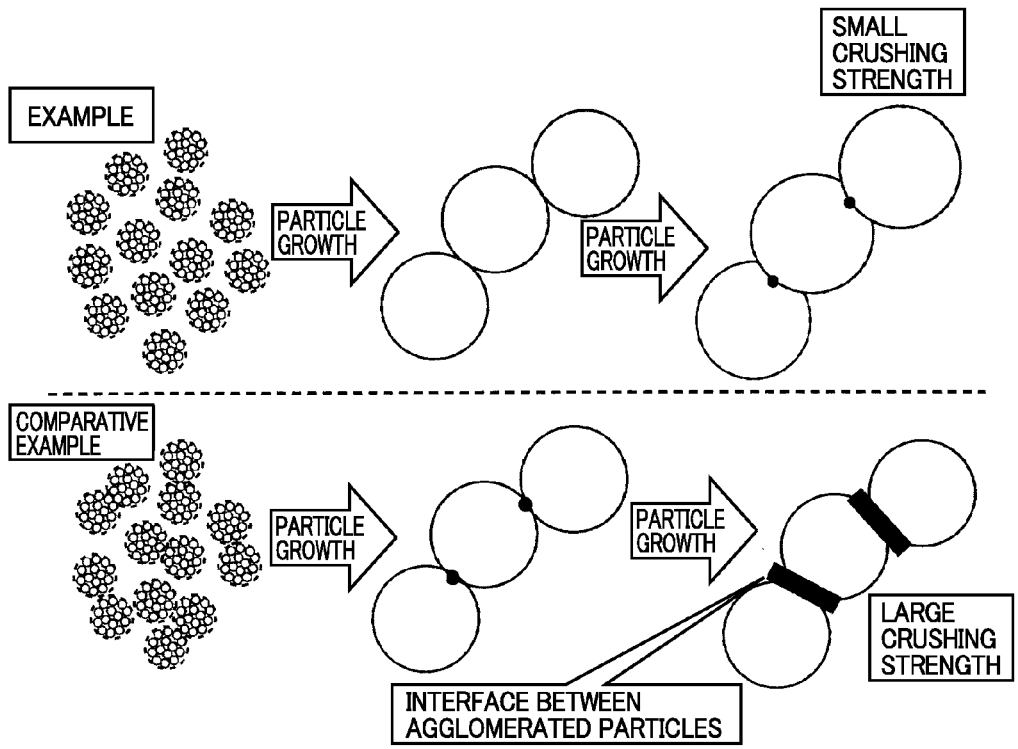
FIG. 6 is a diagram showing images of particle growth by a heat treatment (a calcination treatment) of barium titanate powder according to Example and Comparative Examples (Comparative Example 1 and Comparative Example 2), including an upper image in Example and a lower image in each Comparative Example.

Therefore, it is considered that, when the dry powder obtained in each of Comparative Examples 1 and 2 is calcined, the frequency of occurrence of agglomerated particles is increased by firing (the number of contacts between particles increases), so that a stress occurs at the contact point and the crystallinity (the c/a axial ratio) lowers. The image of this state is shown on the lower side of FIG. 6. Furthermore, it is considered that, when agglomerated particles are produced (see the lower side in FIG. 6), a reaction occurs at the particle interface so that the crushing strength is increased, and also, a stress is exerted on the crystals near the interface so that a distortion occurs in the lattice, with the result that the crystallinity (c/a axial ratio) lowers.

In this way, drying under normal pressure or drying under reduced pressure may cause production of coarse particles after calcination due to agglomeration. In this case, when such drying is applied to a thin multilayer ceramic capacitor, a short circuit failure resulting from such coarse particles occurs, which may lower the non-defective rate in the manufacturing process.

On the other hand, it is considered that agglomerativity is relatively low in the case of dry powder obtained in Example, so that the crystallinity (c/a axial ratio) is improved after calcination. The image of this state is shown on the upper side in FIG. 6. In addition, the barium titanate powder obtained by drying under increased pressure as in Example has a relatively small particle size and exhibits a relatively high c/a axial ratio. Accordingly, it is considered that, when such barium titanate powder is used for a multilayer ceramic capacitor, a high dielectric constant $\in r$ is obtained while particle growth is suppressed, with the result that the reliability is improved. Also, the agglomerativity and the crystallinity of the produced barium titanate powder was evaluated based on simple indexes such as crushing strength shown in Table 1 and crystallinity (c/a axial ratio) shown in the graph of FIG. 3.

Drying of barium titanate powder progresses from the liquid phase through the gaseous phase in the solvent evaporating process. In this process, the liquid crosslinking force acts to attract particles of the barium titanate powder to each other. This is a main factor of causing dry aggregation of barium titanate powder. This liquid crosslinking force has a proportional relationship with the surface tension of the solvent. Accordingly, the smaller the surface tension, the smaller the liquid crosslinking force (see FIG. 5).

It is also considered that, in this Example, by employing drying under increased pressure for separating barium titanate powder by evaporating a solvent while pressurizing the slurry obtained by dispersing fine barium titanate powder in the solvent, the liquid crosslinking force exerted between the particles of barium titanate powder is reduced, so that the agglomeration degree is lowered and merely a slight stress is exerted between the particles, with the result that powder with high crystallinity can be designed.

Furthermore, since there exists a correlation between the boiling point and the surface tension of the solvent, and the surface tension is also lowered by raising the boiling point, the action of pressurizing the slurry serves to pressurize the solvent as means for raising the boiling point.

In this way, by the method of manufacturing barium titanate according to the present invention described above using drying under increased pressure, barium titanate powder with low agglomerativity and high crystallinity can be manufactured. That is, barium titanate powder with high tetragonality can be manufactured irrespective of a fine particle size of 80 nm to 150 nm. Accordingly, the manufactured barium titanate powder can sufficiently address reduction in element thickness of a dielectric of a multilayer ceramic capacitor. Furthermore, an electronic component, for example, such as a multilayer ceramic capacitor having an element produced from barium titanate powder with high tetragonality is obtained so as to address reduction in thickness, irrespective of a fine particle size of 80 nm to 150 nm.

Furthermore, in the method of manufacturing barium titanate according to the present invention as described above, the eventually manufactured barium titanate powder is obtained by a reaction caused by adding a hydroxide of an alkaline earth metal element to titanium oxide slurry obtained by dispersing titanium oxide powder in water, so that finer barium titanate powder with high tetragonality can be obtained.

Furthermore, in the method of manufacturing barium titanate according to the present invention as described above, since noncombustible $N_2$ gas as gas for pressurizing the slurry is used, this gas can be easily handled.

In the method of manufacturing barium titanate according to the present invention as described above, ethanol is used as a solvent in the slurry in which fine barium titanate powder is dispersed. However, the solvent is not limited to ethanol, but solvents such as water, isopropyl alcohol and methyl ethyl ketone may be pressurized so that the boiling point is raised and the surface tension is lowered, with the result that agglomeration during drying can be suppressed as in the case of ethanol. Such a solvent can be made, for example, of at least one of a water-based solvent, an organic-based solvent, and a water-based and organic-based mixed solvent.

Furthermore, in the method of manufacturing barium titanate according to the present invention as described above, the step of separating barium titanate powder by evaporating a solvent while pressurizing the slurry may include: a pressurizing step of pressurizing the slurry by putting the slurry into a container, heating the slurry from outside of the container, and evaporating a solvent in the slurry; a pressurizing step of pressurizing the slurry by putting the slurry into a container and filling the container with gas from the outside of the container; or both of these pressurizing steps.

Barium titanate manufactured by the manufacturing method according to the present invention is not only $BaTiO_3$, but also may be a substance obtained, for example, by replacing a part of Ba in $BaTiO_3$ with Ca or Sr.

Barium titanate manufactured by the method of manufacturing barium titanate according to the present invention is suitably used particularly as a dielectric material for a multilayer ceramic capacitor, for example.

REFERENCE SIGNS LIST 10 manufacturing apparatus, 12 gas container, 12a heater, 14 feed pipe, 16 pressure valve, 18 pressure container, 18a heater, 18b stirring blade, 20 discharge pipe, 22 automatic pressure regulation valve, 24 collection unit.

The invention claimed is:

1. A method of manufacturing barium titanate powder the method comprising:
   providing a slurry containing barium titanate dispersed in a solvent;
   separating the barium titanate from the slurry by evaporating the solvent while pressurizing the slurry; and
   heat-treating the separated barium titanate to produce the barium titanate powder, wherein the barium titanate that is dispersed in the slurry is obtained by a reaction caused by adding barium hydroxide to a titanium oxide slurry containing titanium oxide powder dispersed in water.

2. The method of manufacturing barium titanate powder according to claim 1, wherein the solvent is at least one of a water-based solvent, an organic-based solvent, and a water-based and organic-based solvent.

3. The method of manufacturing barium titanate powder according to claim 1, wherein the solvent is ethanol.

4. The method of manufacturing barium titanate powder according to claim 3, wherein a concentration of the ethanol in the solvent is 5 vol %.

5. The method of manufacturing barium titanate powder according to claim 1, wherein the barium titanate is separated from the slurry by pressurizing the slurry by putting the slurry into a container, heating the slurry from an outside of the container, filling the container with a gas from the outside of the container, and evaporating the solvent from the slurry.

6. The method of manufacturing barium titanate powder according to claim 5, wherein the gas is $N_2$.

7. The method of manufacturing barium titanate powder according to claim 1, wherein the barium titanate is separated from the slurry by pressurizing the slurry by putting the slurry into a container, heating the slurry from an outside of the container, and evaporating the solvent from the slurry.

8. The method of manufacturing barium titanate powder according to claim 1, wherein the barium titanate is separated from the slurry by pressurizing the slurry by putting the slurry into a container and filling the container with a gas from an outside of the container.

9. The method of manufacturing barium titanate powder according to claim 8, wherein the gas is $N_2$.

10. The method of manufacturing barium titanate powder according to claim 1, wherein a specific surface area of the barium titanate dispersed in the slurry is 65 $m^2/g$.

11. The method of manufacturing barium titanate powder according to claim 10, wherein a c/a axis ratio of the barium titanate dispersed in the slurry is 1.0000.

12. The method of manufacturing barium titanate powder according to claim 1, wherein a c/a axis ratio of the barium titanate dispersed in the slurry is 1.0000.

13. The method of manufacturing barium titanate powder according to claim 1, wherein the slurry is pressurized at 0.2 MPa.

14. The method of manufacturing barium titanate powder according to claim 1, wherein the heat treating of the separated barium titanate is carried out at a temperature of 800° C. to 1000° C.

15. The method of manufacturing barium titanate powder according to claim 1, wherein a c/a axis ratio of the produced barium titanate powder is 1.009 or more.

16. The method of manufacturing barium titanate powder according to claim 11, wherein a c/a axis ratio of the produced barium titanate powder is 1.009 or more.

17. The method of manufacturing barium titanate powder according to claim 12, wherein a c/a axis ratio of the produced barium titanate powder is 1.009 or more.

* * * * *